United States Patent
Bektas et al.

(10) Patent No.: US 10,318,517 B2
(45) Date of Patent: *Jun. 11, 2019

(54) QUERY DRIVEN DATA COLLECTION ON PARALLEL PROCESSING ARCHITECTURE FOR LICENSE METRICS SOFTWARE

(71) Applicant: International Business Machines Corporation, Armonk, NY (US)

(72) Inventors: Umit Bektas, Cracow (PL); Pawel T. Januszek, Kraków (PL); Piotr Kania, Kraków (PL); Konrad K. Skibski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 15/281,278

(22) Filed: Sep. 30, 2016

(65) Prior Publication Data

US 2018/0096014 A1  Apr. 5, 2018

(51) Int. Cl.
*G06F 17/30* (2006.01)
*G06F 16/23* (2019.01)
*G06F 11/30* (2006.01)
*G06F 16/2455* (2019.01)
*H04L 12/26* (2006.01)

(52) U.S. Cl.
CPC .......... *G06F 16/23* (2019.01); *G06F 11/3065* (2013.01); *G06F 16/2455* (2019.01); *H04L 43/04* (2013.01); *H04L 43/0811* (2013.01); *H04L 43/12* (2013.01)

(58) Field of Classification Search
CPC . G06F 17/30345; G06F 16/23; G06F 11/3065
See application file for complete search history.

(56) References Cited

U.S. PATENT DOCUMENTS

| 7,177,858 | B2 | 2/2007 | Belowsov |
| 7,756,827 | B1 | 7/2010 | Yung et al. |
| 8,719,254 | B2 | 5/2014 | Yang et al. |
| 9,652,812 | B2 | 5/2017 | Gocek et al. |
| 2003/0037251 | A1 | 2/2003 | Frieder et al. |
| 2003/0093408 | A1* | 5/2003 | Brown .............. G06F 17/30336 |

(Continued)

OTHER PUBLICATIONS

Betkas et al., "Query Driven Data Collection on Parallel Processing Architecture for License Metrics Software", U.S. Appl. No. 15/848,054, filed Dec. 20, 2017, 37 pages.

(Continued)

*Primary Examiner* — Cam Y T Truong
(74) *Attorney, Agent, or Firm* — William H. Hartwell

(57) ABSTRACT

A method for collecting monitoring data on a set of monitored computers. The method comprises providing definitions for collection methods for a set of monitoring data, wherein the monitoring data is collected from agents running at monitoring computers, wherein each item of monitoring data has at least one respective collection method. The method further comprises determining a subset of monitoring data to be updated. The method further comprises identifying collection methods corresponding to the subset of monitoring data and triggering the agents running at the monitoring computers to collect monitoring data using the identified collection methods.

6 Claims, 6 Drawing Sheets

(56) References Cited

U.S. PATENT DOCUMENTS

| | | | |
|---|---|---|---|
| 2015/0278314 A1* | 10/2015 | Fuglsang | G06F 17/30292 |
| | | | 707/736 |
| 2015/0350361 A1 | 12/2015 | Bektas et al. | |
| 2016/0004848 A1* | 1/2016 | Gocek | G06F 21/105 |
| | | | 726/26 |
| 2016/0026968 A1 | 1/2016 | Fan et al. | |
| 2018/0096016 A1 | 4/2018 | Bektas et al. | |

OTHER PUBLICATIONS

IBM, Appendix P, List of IBM Patents or Patent Applications Treated as Related, dated Jan. 9, 2018, 2 pages.

\* cited by examiner

QUERY DRIVEN DATA COLLECTION ON PARALLEL PROCESSING ARCHITECTURE FOR LICENSE METRICS SOFTWARE

BACKGROUND

The present invention relates generally to the field of data collection, and more particularly to collecting monitoring data on a set of monitored computers.

Software Asset Management (SAM) is the practice used by organizations to reduce IT costs and maximize return on investments by optimizing the purchasing, deploying, and maintaining of software applications. There are several technologies and tools which can be used to implement and support the SAM process such as software inventory tools, license managers, application control tools, software deployment tools, request management tools, and patch management tools.

Software inventory tools are used to discover installed software over an organization's computer networks. These tools allow administrators to determine what software is installed on computers and servers and also provide information such as product IDs, program size, date installed, location on the hard disk, and installed version. Software license managers provide organizations with the ability to control what software applications are permitted to execute in their environments and where they can execute. Software license managers protect organizations from losses due to software piracy and also enable them to comply with software license agreements. Software license manager tools provide a repository of current license entitlements which can be cross-referenced with information from software inventory tools to provide a view of an organization's software licensing compliance. Application control tools restrict what software can be installed and executed on computers within an organization. For example, applications installed from unofficial sources may be more likely to contain malicious code aimed at disrupting operations or stealing confidential information. Other benefits of application control include restricting the use of non-business applications to improve network performance or comply with HR guidelines, and managing endpoint configurations to enhance security.

Software deployment tools automate the deployment activities of new software. These activities include releasing new software, managing the installation and activation process, deactivating or removing selected software, updating, and retiring software applications. Request management tools allow organizations to manage and track software applications by requiring employees to place requests for applications. Patch management tools automate software application patches, which ensure all computers are using the latest and most secure software.

Software asset management solutions' capacities are hard to scale, sometimes resulting in applications that do not meet current requirements for medium, large enterprise, or cloud environments. Software asset management discovery is based on defined scan groups, and schedules scans of the hardware and software topology. For example, agents may perform scans only within a given period of time, which limits discovery to a single scan result within the given period. In this manner, real time discovery is not possible. If agents were configured to scan on a daily basis in a large scale environment, then the number of executable files and instances of each could result in massive volumes of data generated and could overload the SAM server.

SUMMARY

Embodiments of the present invention disclose a method, computer program product, and system for collecting monitoring data on a set of monitored computers. The method comprises providing definitions for collection methods for a set of monitoring data, wherein the monitoring data is collected from agents running at monitoring computers, wherein each item of monitoring data has at least one respective collection method. The method further comprises determining a subset of monitoring data to be updated. The method further comprises identifying collection methods corresponding to the subset of monitoring data and triggering the agents running at the monitoring computers to collect monitoring data using the identified collection methods.

DETAILED DESCRIPTION

Embodiments in accordance with the present invention recognize that distributed asset management software can be improved by creating tables with collected asset management data, marking columns/rows of those tables (or the tables themselves) with methods of collecting their respective data, and in response to queries for asset management data, only executing the methods that are required for the that data and/or have the lowest cost to perform.

Current asset management systems (for example, license managers) process queries based on multiple sources of data, such as file systems, native registries, hardware information etc. In a multiple agent environment, the multiplicity of platforms, operating systems, and hardware architectures increases significantly with environment size. This is typically seen in large computing environments with thousands of networking endpoints (i.e., computer systems). With current license metric software solutions, data sources are collected by a fixed number of data collection methods distributed out of the box with an agent. The agent has methods that collect all available data and upload the data back to a server for further processing. However, these methods have limitations: (i) all available data is collected, which is unnecessary from the expected license calculations perspective, (ii) data collection methods highly consume agent resources when scanning all available data, (iii) data collection methods take time long periods of time to complete when scanning all available data, and (iv) for simple license reports (e.g., how many instances of Software A are installed), all data must be collected, uploaded, and processed.

Embodiments of the present invention can be applied to a wide variety of asset management architectures, such as software license metric software, physical asset management software, and digital content management software, for example. Embodiments of the present invention provide a method to annotate queried rows/columns of asset management data tables with the data discovery/collecting methods used to obtain that data (for example, methods to perform hardware scans and/or software usage scans based on requested query interpretation). Some embodiments can calculate the cost of execution for a given data collecting method based on resource usage of that collecting method, and some embodiments can calculate the cost of execution based on feedback from the method execution on agent systems.

Figure 1:
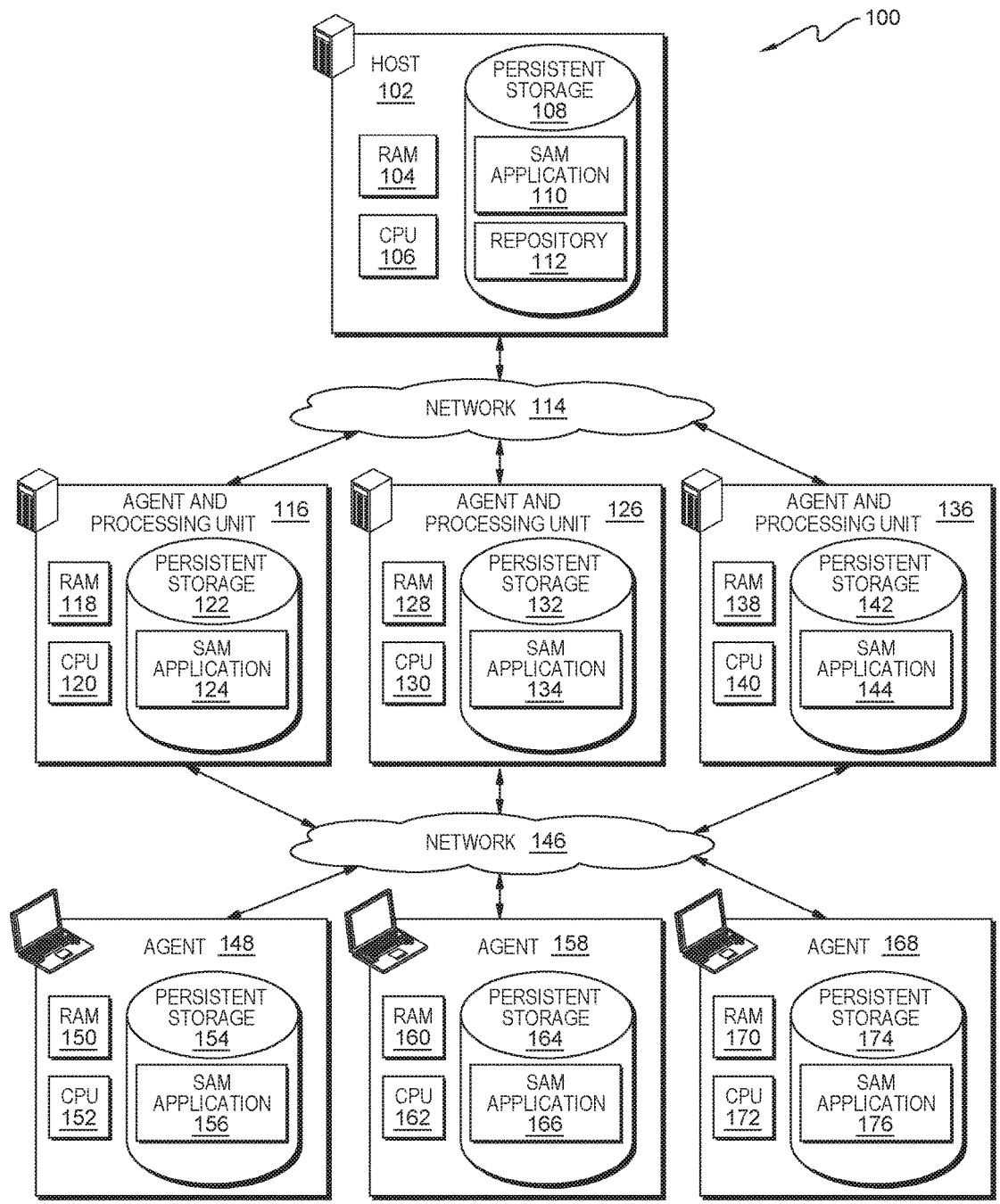
FIG. 1 is a functional block diagram illustrating a software asset management environment, in an embodiment in accordance with the present invention.

Embodiments in accordance with the present invention will now be described in detail with reference to the Figures. FIG. 1 is a functional block diagram, generally designated 100, illustrating a software asset management environment, in an embodiment in accordance with the present invention.

Software asset management environment 100 includes host 102, agent and processing unit 116, 126 and 136, agent 148, 158, and 168, and other computing devices (not shown), all interconnected over network 114 and 146. Host 102 includes random access memory (RAM) 104, central processing unit (CPU) 106, and persistent storage 108. Host 102 may be a Web server, or any other electronic device or computing system, capable of processing program instructions and receiving and sending data. In some embodiments, host 102 may be a laptop computer, a tablet computer, a netbook computer, a personal computer (PC), a desktop computer, a personal digital assistant (PDA), a smart phone, or any programmable electronic device capable of communicating over a data connection to network 114. In other embodiments, host 102 may represent server computing systems utilizing multiple computers as a server system, such as in a distributed computing environment. In general, host 102 is representative of any electronic device or combinations of electronic devices capable of executing machine-readable program instructions and communicating with agent and processing unit 116, 126 and 136, agent 148, 158, and 168, and other computing devices (not shown), over data connections to network 114 and 146 within software asset management environment 100.

Host 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Host 102 may include internal and external hardware components, as depicted and described in further detail with respect to FIG. 6.

SAM application 110 and repository 112 are stored in persistent storage 108, which also includes operating system software (not shown), as well as software that enables host 102 to communicate with agent and processing unit 116, 126 and 136, agent 148, 158, and 168, and other computing devices (not shown) of software asset management environment 100 over a data connection on network 114 and 146. In other example embodiments, SAM application 110 and repository 112 may be components of an operating system software.

SAM application 110 is a computer program, or set of computer programs, that is stored in persistent storage 108. SAM application 110 enables a user to perform software asset management queries on a massive parallel processing architecture by annotating rows/columns of queried tables (or annotating the tables themselves) with data discovery methods used to perform the requested hardware and/or software usage scan. For example, a user can submit a SAM request to host 102 and is received by SAM application 110. SAM application 110 analyzes and translates the SAM request into a Structured Query Language (SQL) query. SQL is a programming language used primarily for manipulation of data elements stored in a data structure. Although often associated with databases, through appropriate application design, SQL can be used to support operations on remotely acquired data stored in a simpler data structure, for example.

The SQL query is then optimized and a list of tables and rows/columns that are required to process the query are generated. SAM application then maps required program methods to the tables and rows/columns that can gather the requested data from agent and processing units 116, 126 and 136, and agents 148, 158, and 168. SAM application 110 then determines the costs for each of the required program methods and determines a final list of program methods to be used. The requested data is then obtained from the agents and processing units by executing the final list of methods one at a time. The returned data is then written to tables that are used by SAM application 110 for further query processing and the result is returned to the user.

Repository 112 is a computer program, or set of computer programs, that is stored in persistent storage 108. Repository 112 contains the most recent rules and methods used to gather data from agent and processing unit 116, 126 and 136, agent 148, 158, and 168, and other computing devices (not shown) of software asset management environment 100.

In FIG. 1, network 114 and 146 is shown as the interconnecting fabric between host 102, agent and processing unit 116, 126 and 136, agent 148, 158, and 168, and with various components and devices (not shown) within software asset management environment 100. In practice, the connection may be any viable data transport network, such as, for example, a LAN or WAN. Network 114 and 146 can be for example, a local area network (LAN), a wide area network (WAN) such as the Internet, or a combination of the two, and include wired, wireless, or fiber optic connections. In FIG. 1, network 146 can be a subnet of network 114. In computer networking, a subnet is a logical subdivision of an IP network. In general, network 114 and 146 can be any combination of connections and protocols that will support communications between host 102, agent and processing unit 116, 126 and 136, agent 148, 158, and 168, and with various components and devices (not shown) within software asset management environment 100.

Agent and processing unit 116, 126 and 136 are included in software asset management environment 100. In this example embodiment, agent and processing unit 116, 126 and 136 are identical in regards to hardware and software. In one example embodiment, agent and processing unit 116, 126 and 136 are a subset of networking endpoints (i.e., agents) generally selected at initial system configuration, but subject to subsequent change by a system administrator. Agent and processing unit 116, 126 and 136 generally represent a group of network endpoints having at least a minimum amount of processing power, remaining online at all times using high availability features to maintain data from the whole environment, process queries, and return results and partial results to the host. In the scope of the present invention, partial results are results determined at a processing unit (e.g., agent and processing unit 116), after collection of data from a subordinate group of agents (e.g., agent 148). After all appropriate data has been collected at a processing unit and any required calculations have been completed, partial results are transmitted to the host. Agent and processing unit 116, 126 and 136 include random access memory (RAM) 118, 128, and 138, central processing unit (CPU) 120, 130, and 140, and persistent storage 122, 132, and 142. Agent and processing units 116, 126 and 136 may be Web servers, or any other electronic device or computing system, capable of processing program instructions and receiving and sending data. In some embodiments, agent and processing units 116, 126 and 136 may be laptop computers, tablet computers, netbook computers, personal computers (PCs), desktop computers, personal digital assistants (PDAs), smart phones, or any programmable electronic device capable of communicating over a data connection to network 114 and 146. In other embodiments, agent and processing units 116, 126 and 136 may represent server computing systems utilizing multiple computers as a server system, such as in a distributed computing environment. In general, agent and processing units 116, 126 and 136 are representative of any electronic devices or combinations of electronic devices capable of executing machine-readable program instructions and communicating with host 102, and agents 148, 158, and 168 via network 114 and 146 and with various components and devices (not shown) within software asset management environment 100.

Agent and processing units 116, 126 and 136 include persistent storage 122, 132, and 142. Persistent storage 122, 132, and 142 may, for example, be a hard disk drive. Alternatively, or in addition to a magnetic hard disk drive, persistent storage 122, 132, and 142 may include a solid state hard drive, a semiconductor storage device, read-only memory (ROM), erasable programmable read-only memory (EPROM), flash memory, or any other computer-readable storage medium that is capable of storing program instructions or digital information. SAM applications 124, 134, and 144 are stored in persistent storage 122, 132, and 142, respectively, which also include operating system software (not shown), as well as software that enables agent and processing units 116, 126 and 136 to detect and establish a connection to host 102, agents 148, 158, and 168, and communicate with other computing devices (not shown) of software asset management environment 100 over a data connection on network 114 and 146. SAM applications 124, 134, and 144 receive and make final calculations on partial results received from agents 148, 158, and 168 and from agent and processing units 116, 126 and 136. Additionally, SAM applications 124, 134, and 144 receive the validated rules for a given query request from host 102.

Agents 148, 158 and 168 are included in software asset management environment 100. The term agent is generally synonymous with network endpoint. In some instances, in which usage can be inferred from context, the term agent may be used to distinguish computing devices merely hosting target software from the subset of computing devices that act as processing units. In this example embodiment, agents 148, 158 and 168 are identical in regards to hardware and software. Agents 148, 158 and 168 include RAM 150, 160, and 170, respectively, CPU 152, 162, and 172, respectively, and persistent storage 154, 164, and 168, respectively. Agents 148, 158 and 168 may be Web servers, or any other electronic device or computing system, capable of processing program instructions and receiving and sending data. In some embodiments, agents 148, 158 and 168 may be laptop computers, tablet computers, netbook computers, PCs, desktop computers, PDAs, smart phones, or any programmable electronic device capable of communicating over a data connection to network 114 and 146. In other embodiments, agents 148, 158 and 168 may represent server computing systems utilizing multiple computers as a server system, such as in a distributed computing environment. In general, agents 148, 158 and 168 are representative of any electronic devices or combinations of electronic devices capable of executing machine-readable program instructions and communicating with host 102, and agent and processing units 116, 126 and 136 via network 114 and 146 and with various components and devices (not shown) within software asset management environment 100.

Agents 148, 158 and 168 include persistent storage 154, 164, and 174, respectively. Persistent storage 154, 164, and 174 may, for example, be hard disk drives. Alternatively, or in addition to a magnetic hard disk drive, persistent storage 154, 164, and 174 may include a solid state hard drive, a semiconductor storage device, read-only memory (ROM), erasable programmable read-only memory (EPROM), flash memory, or any other computer-readable storage medium that is capable of storing program instructions or digital information. SAM applications 156, 166, and 176 are stored in persistent storage 154, 164, ands 174, respectively, which also include operating system software (not shown), as well as software that enables agents 148, 158 and 168 to detect and establish a connection to host 102, agent and processing units 116, 126 and 136, and communicate with other computing devices (not shown) of software asset management environment 100 over a data connection on network 114 and 146. SAM applications 156, 166, and 176 perform checking actions, such as looking for particular software instances or discovering hardware infrastructure and monitoring processes in use. For example, verified rules are received and applied from host 102. SAM application 156, 166, and 176, as well as 124, 134, and 144, then perform the appropriate scan for the given software or hardware. Results from the agents are then sent to agent and processing units 116, 126 and 136 using a globally defined hash function that is defined and stored on agents 148, 158, and 168 at SAM installation time or when processing units are redefined. Software asset management environment 100 can consist of many more agents than are depicted in this figure.

Figure 2:
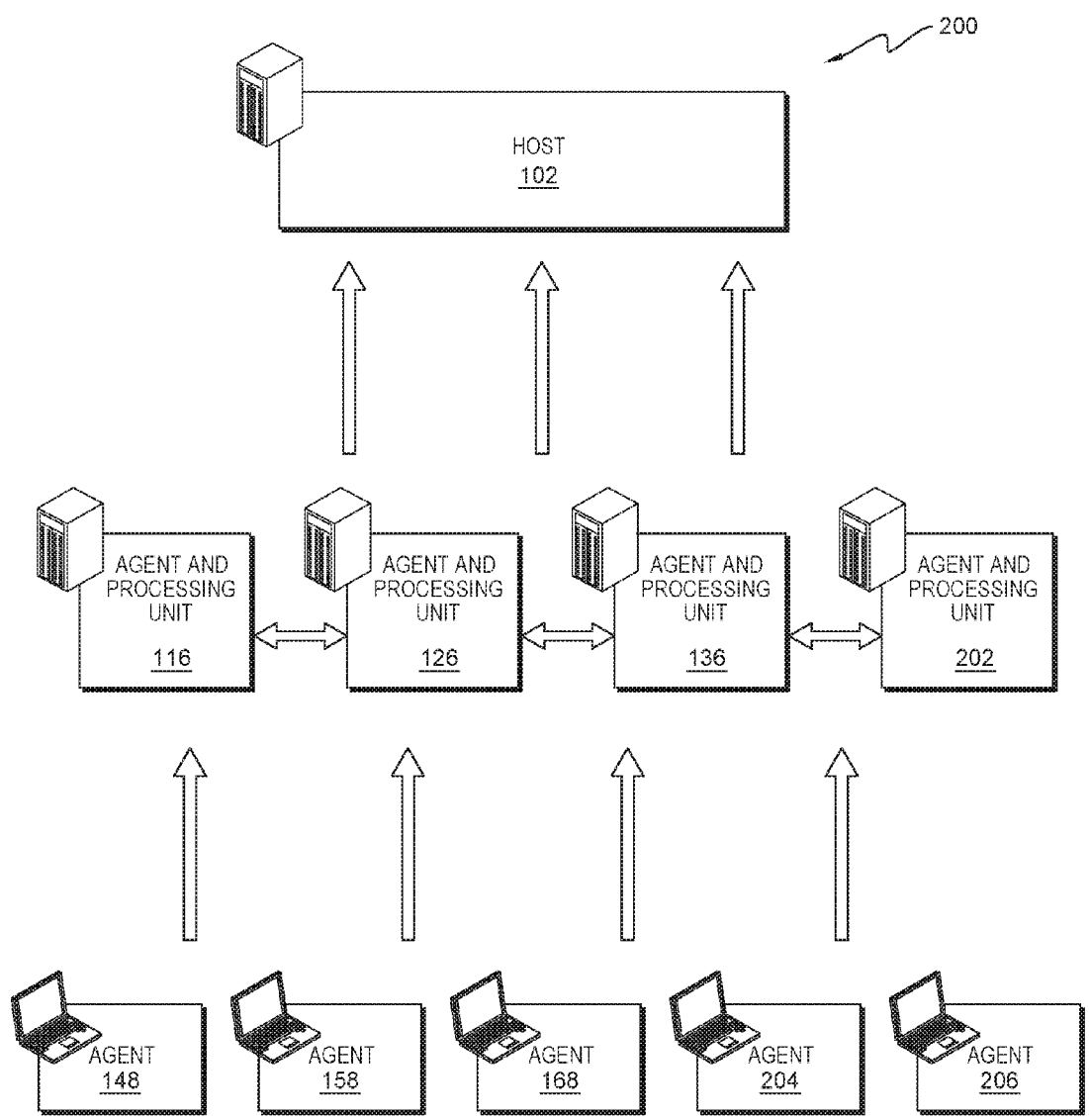
FIG. 2 is a diagram illustrating the flow of returned results from agents and processing units of a software asset management query to a host computer within the software asset management environment of FIG. 1, in an embodiment in accordance with the present invention.

FIG. 2 is a diagram, generally designated 200, illustrating the flow of returned results from agents and processing units of a software asset management query to a host computer within the software asset management environment of FIG. 1, in an embodiment in accordance with the present invention. Continuing with the previous example, where a user submits a SAM request to SAM application 110 on host 102, upon analyzing and translating the SAM request into a SQL query, SAM application 110 optimizes the SQL query and a list of tables and rows/columns that are required to process the query is generated. SAM application then maps required program methods that can gather the requested data from agent and processing units 116, 126 and 136, and agents 148, 158, and 168 to the tables and/or their respective rows/columns. For example, SAM application 110 determines one or more program methods that can be used to retrieve the desired data. SAM application 110 then determines the costs (e.g., the required processing time, amount of memory used, hardware, etc.) for each of the required program methods and determines a final list of program methods to be used. SAM application 110 then obtains the requested data from the agents and processing units by executing the final list of methods one at a time. For example, agent and processing units 116, 126, 136, and 202, and agents 148, 158, 168, 204, and 206, process the methods and return results to pre-assigned processing units. For example, at a certain time, SAM application 156 on agent 148 can be configured to return SAM results to agent and processing unit 116. Additionally, agent and processing unit 116 can be configured to return SAM results to agent and processing unit 126. In other example embodiments, there can be many agents and processing units configured to return results to a particular agent and processing unit.

Agent and processing unit 116 receives the results of the processed queries from one or more agents and can perform required calculations or merge data from the partial results before returning the results back to host 102. For example, upon receiving the requested query to determine the number of installed copies of "Software Abc" on all network endpoints within software asset management environment 100, agent and processing unit 116 receives a plurality of partial results from one or more agents (e.g., agent 148 and agent and processing unit 126), then can perform further calculations and/or merge the received data before transmitting results back to host 102. The same process occurs on agent and processing unit 126, 136, and 202.

Upon performing further calculations and/or merging the received data (e.g., partial results), from all the active network endpoints that received the query, agent and processing unit 116, 126, 136, and 202 return the merged results to host 102 where further processing continues. SAM application 110 on host 102 receives the merged results and performs further calculations and/or merging of the results. For example, SAM application 110 on host 102 can perform a final query on the merged results from agent and processing unit 116, 126, 136, and 202 then return the result to the user.

Figure 3:
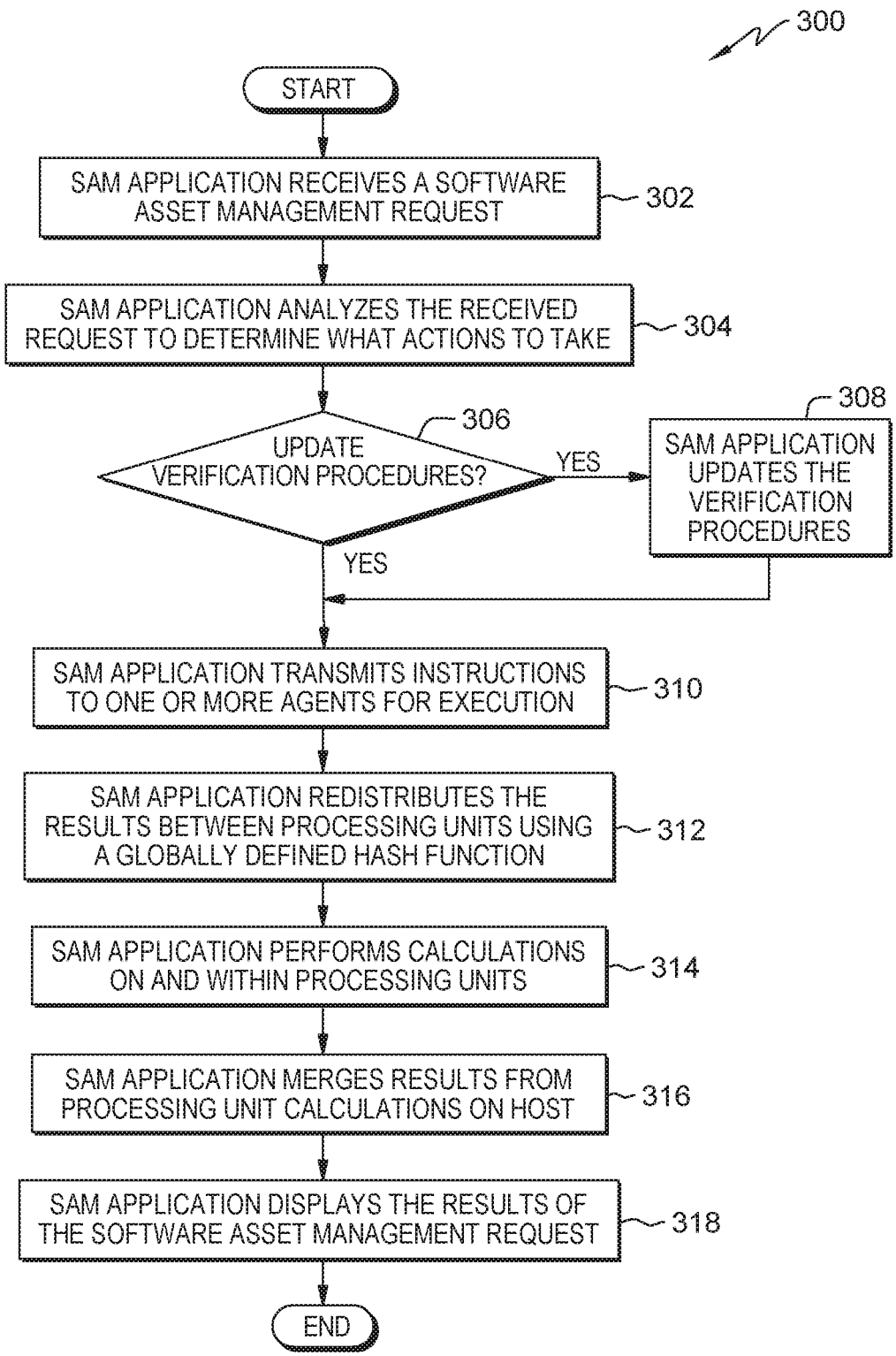
FIG. 3 is a flowchart depicting operational steps of a software asset management program, on a host computer within the data processing environment of FIG. 1, for performing a software asset management query within the software asset management environment of FIG. 1, in an embodiment in accordance with the present invention.

FIG. 3 is a flowchart, generally designated 300, depicting operational steps of a software asset management program, on a host computer within the data processing environment of FIG. 1, for performing a software asset management query within the software asset management environment of FIG. 1, in an embodiment in accordance with the present invention. In an example embodiment, a user issues a SAM request on host 102 to determine the number of computing devices that have "Software Abc" installed. For example, an administrator wants to know how many computing devices within software asset management environment 100 have installed "Software Abc". In other example embodiments, an administrator can perform real-time queries to determine types of hardware, such as CPU speed, the amount of installed memory, and/or hard disk size within software asset management environment 100. In general, an administrator can perform real-time operations to determine, or configure, any SAM function within software asset management environment 100.

SAM application 110 receives a software asset management request as depicted in step 302. For example, SAM application 110 receives the SAM request from an administrator that wants to know how many computing devices within software asset management environment 100 have installed "Software Abc". In one example embodiment, SAM application 110 can receive SAM requests from a user via a user interface. In other example embodiments, SAM application 110 may be previously configured to perform SAM requests at scheduled intervals. For example, SAM application 110 can be configured to gather all hardware and software information for all computing devices within software asset management environment 100 at 12:00 noon, once every month.

In step 304, SAM application 110 analyzes the received request to determine what actions to take. For example, SAM application determines what kind of actions need to be taken on the network endpoints (e.g., agent and processing unit 116, 126 and 136, agent 148, 158, and 168), to obtain all data needed for providing results. In one example embodiment, SAM application 110 can translate the SAM request into an SQL query to understand which tables and statistics to read in order to provide results to the user.

In decision step 306, SAM application 110 checks repository 112 to determine if new verification procedures are available to execute the SAM request. For example, repository 112 can contain a set of verification steps used to obtain all requested data on the network endpoints (e.g., agent and processing unit 116, 126 and 136, agent 148, 158, and 168). If SAM application 110 determines that there are new verification procedures in repository 112, SAM application 110 updates the current verification procedures using the new verification procedures found in repository 112 as depicted in step 308. If SAM application 110 determines that there are no new verification procedures in repository 112, SAM application 110 transmits instructions to one or more agents for execution as depicted in step 310. For example, SAM applications transmits the SAM query request to agent and processing unit 116, 126 and 136, agent 148, 158, and 168 to determine how many computing devices within software asset management environment 100 have installed "Software Abc".

SAM application 110 redistributes the results between processing units using a globally defined hash function as depicted in step 312. For example, upon executing the SAM query, agent and processing unit 116, 126 and 136, agent 148, 158, and 168 return results to a designated processing unit as described in FIG. 2. In addition to processing the SAM query, agent and processing unit 116, 126 and 136 receive results from other processing units. For example, processing units may offload results to other processing units to speed up the calculations and/or merging of the returned partial results to host 102.

In step 314, SAM application 124, 134, and 144 perform calculations on and within processing units. For example, as results are received from agents (i.e., computing devices or networking endpoints), SAM application 124, 134, and 144 can perform additional calculations based on the verification procedures defined and transmitted by host 102. In one example embodiment, SAM application 124, 134, and 144 can perform additional queries on the returned results. In other example embodiments, SAM application 124, 134, and 144 can merge the returned data before returning any results to host 102.

SAM application 110 merges results from processing unit calculations on host 102 as depicted in step 316. For example, upon receiving the partial results from agent and processing unit 116, 126 and 136, SAM application 110 on host 102 can perform a final calculation, such as merging, the returned partial results. In other example embodiments, SAM application 110 can perform additional queries based on the verification procedures. For example, SAM application 110 can perform an additional query on the merged results to determine how many computing devices within software asset management environment 100 have installed "Software Abc" and the installation dates of "Software Abc" on each computing device.

In step 318, SAM application 110 displays the results of the software asset management request. For example, SAM application 110 displays the final result for the SAM request of how many computing devices within software asset management environment 100 have installed "Software Abc" on a user interface of host 102. In other example embodiments, SAM application 110 may additionally save a report of the software asset management request on persistent storage 108.

Figure 4:
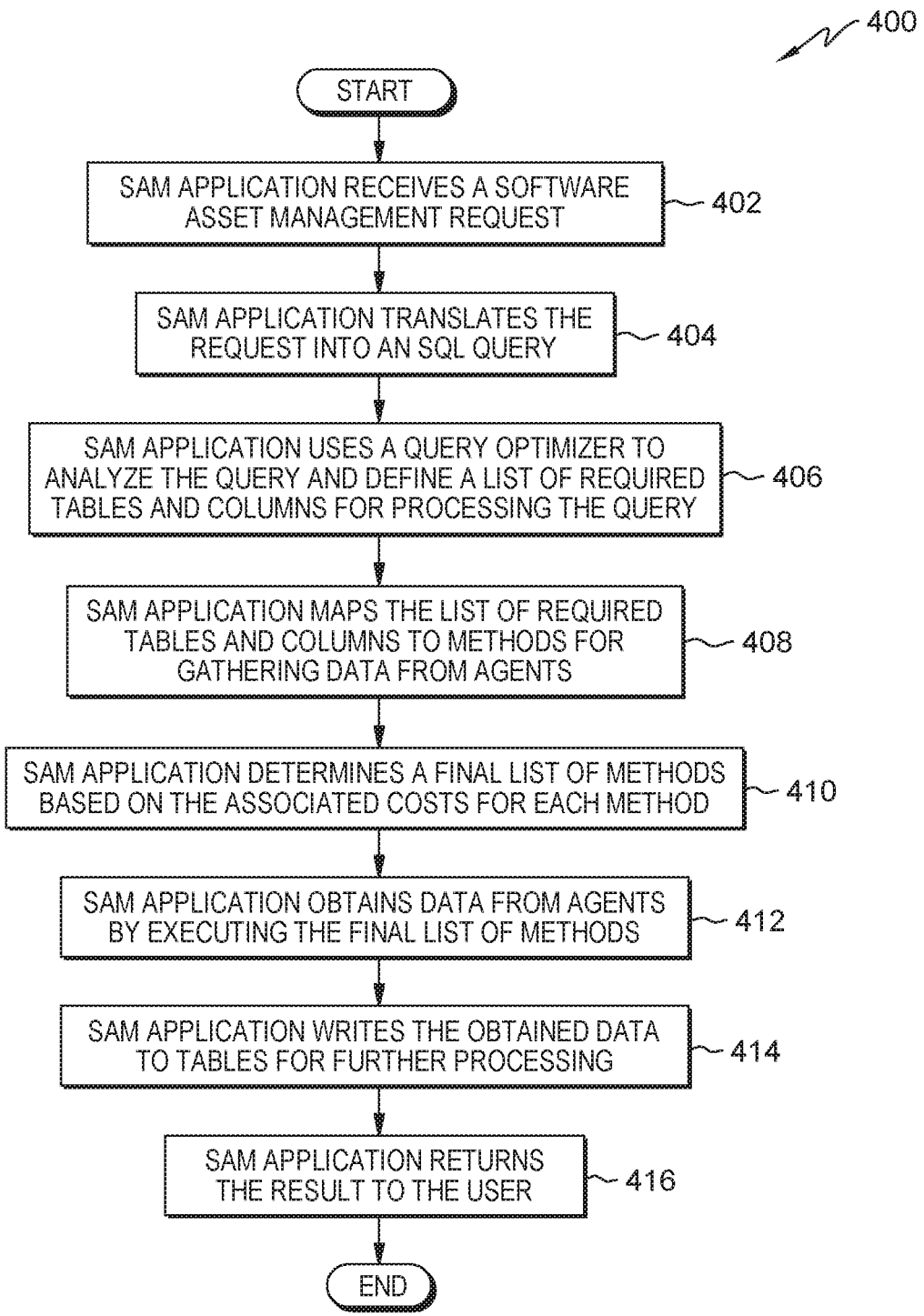
FIG. 4 is a flowchart depicting operational steps of a software asset management program, on a host computer within the data processing environment of FIG. 1, for annotating asset management data tables and/or their rows/columns with data discovery methods, to perform a software asset management query based on a requested query interpretation, in an embodiment in accordance with the present invention.

FIG. 4 is a flowchart, generally designated 400, depicting operational steps of a software asset management program, on a host computer within the data processing environment of FIG. 1, for annotating asset management data tables and/or their rows/columns with data discovery methods, to perform a software asset management query based on a requested query interpretation, in an embodiment in accordance with the present invention. In this embodiment, a user issues a SAM request on host 102 to determine the number of computing devices that have "Software Abc" installed.

SAM application 110 receives a software asset management request as depicted in step 402. For example, as previously described in step 302, SAM application 110 receives the SAM request from an administrator that wants to know how many computing devices within software asset management environment 100 have installed "Software Abc".

In step 404, SAM application 110 translates the request into an SQL query. For example, SAM application translates the SAM request into an SQL query to understand which tables and statistics to read on the network endpoints (e.g., agent and processing units 116, 126 and 136, agents 148, 158, and 168), to obtain all data needed for providing results to the user. An example of the translated SAM request into an SQL query can be seen in Code Snippet 1, as follows:
Code Snippet 1—Translated SQL Query
select
sum(number_of_instance)
from software_table
where name="Software Abc";

In Code Snippet 1, the generated SQL query will find the total number of instances of installed "Software Abc" across the agents of software asset management environment 100.

SAM application 110 uses a query optimizer to analyze the query and define a list of required tables and columns for processing the query as depicted in step 406. For example, SAM application 110 uses a query optimizer component to analyze the query to create an execution plan that contains a list of required tables and columns needed for processing the query. SAM application 110 does this by interpreting the queries from a required data perspective to determine what data is needed to calculate the final result. An example of the interpreted SQL query that defines a list of tables and/or columns can be seen in Code Snippet 2, which follows:

Code Snippet 2—Interpreted SQL Query
SELECT: software_table. number_of_instance
FROM: software_table
WHERE: software_table.name="Software Abc"

In Code Snippet 2, SAM application 110 examines the FROM clause and obtains the taken restrictions (e.g., FROM, WHERE, and JOINS) and the SELECT list. As a result of this step SAM application 110 builds a list of columns and/or whole tables which are required to perform the query calculation.

In step 408, SAM application 110 maps the list of required tables and columns to methods for gathering data from agents. For example, SAM application 110 will annotate, or populate, the list of required tables and columns to one or more function calls, or methods, that can be used to gather the required information from the agents (e.g., agent and processing units 116, 126 and 136, agents 148, 158, and 168). The annotation on the table level (i.e. the annotation of the table as a whole as opposed to a row/column of the table) contains methods required for gathering all data required to fill the table. For example, if the table contains all information about JAVA existence on the systems, the annotation on the table level will contain methods to gather all information about existing JAVA. (Note: the term "JAVA" may be subject to trademark rights in various jurisdictions throughout the world and is used here only in reference to the products or services properly denominated by the marks to the extent that such trademark rights may exist.) The annotation on the row/column level (i.e. the annotation of a particular row/column) contains methods required for gathering data required to fill the row/column. For example, if table contains all information about JAVA existence on the systems, and a particular column contains the JAVA version, the annotation on the column level will contain a method to gather information about JAVA version only. As a result, the annotation on the table level is cumulative in respect to annotations on the row/column level. In one example embodiment, the one or more function calls can be application program interface (API) methods. In other example embodiments, the one or more function calls can be any program function in any programming language.

SAM application 110 determines a final list of methods based on the associated costs for each method as depicted in step 410. For example, upon creating a list of required tables and columns and mapping methods for gathering data, SAM application 110 will determine a cost of executing each method and assign a weight to each method based on the cost of executing the method. For example, a method that can consume more resources and computing cycles will be assigned a higher weight than a method that consume fewer resources and computing cycles. During query execution, the method of obtaining data may be chosen in a way which minimizes the cost of this operation on the agent systems, based on the weights.

In step 412, SAM application 110 obtains data from agents by executing the final list of methods. For example, upon determining a final list of methods based on the associated costs, SAM application determines a final list of methods based on the lowest determined cost of each method. Sam application then executes the steps previously described in steps 310 through 314 of FIG. 3.

SAM application 110 writes the obtained data to tables for further processing as depicted in step 414. For example, upon receiving the partial results from agent and processing units 116, 126 and 136, SAM application 110 on host 102 can perform a final calculation, such as merging the returned partial results as described in step 316.

In step 416, SAM application 110 returns the result to the user. For example, SAM application 110 displays the final result for the SAM request of how many computing devices within software asset management environment 100 have installed "Software Abc" on a user interface of host 102.

Figure 5:
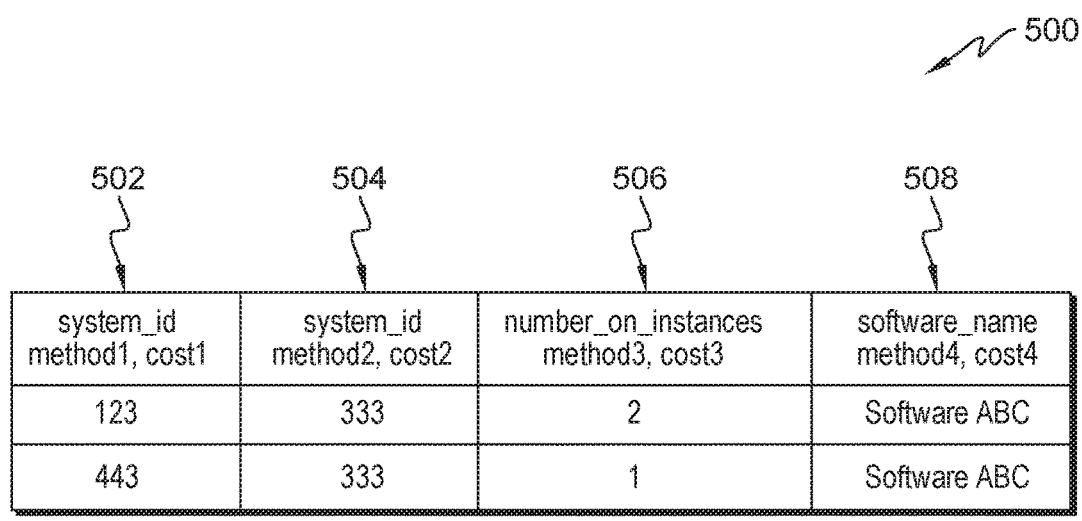
FIG. 5 is a generated table of a software asset management program, on a host computer within the data processing environment of FIG. 1, showing results of a software asset management query within the software asset management environment of FIG. 1, in an embodiment in accordance with the present invention.

FIG. 5 is a generated table, generally designated 500, of a software asset management program, on a host computer within the data processing environment of FIG. 1, showing results of a software asset management query within the software asset management environment of FIG. 1, in an embodiment in accordance with the present invention. It should be appreciated that FIG. 5 provides only an illustration of one implementation and does not imply any limitations with regard to the tables in which different embodiments may be implemented. Many modifications to the depicted table may be made. For example, the table/columns can include a timestamp identifier to indicate the time of day when the data is obtained.

Continuing with the previous example, upon receiving the partial results from agent and processing units 116, 126 and 136, SAM application 110 on host 102 can perform a final calculation, such as merging the returned partial results as described in step 316, and generating table 500. Table 500 contains metrics in columns for "system_id" 502, "software_id" 504, "number_of_instances" 506, and "software_name" 508. The columns also include the executed method and cost for example purposes. In the example table 500, the returned SAM request for determining the number of installed copies of "Software Abc" on all network endpoints within software asset management environment 100, identifies two endpoints, or computing devices, (e.g., "123" and "443"), as indicated in column "system_id" 502. The displayed table also includes the software identifier (e.g., "333"), in column "software_id" 504, the number of instances of "Software Abc" in column "number_of_instances" 506, and the name of the queried software "Software Abc" in column "software_name" 508.

Certain embodiments of the present invention provide a useful performance boost in data collection because only part of the method table is refreshed during query execution based on the column-dedicated method for obtaining the data. This can provide a significant performance improvement resulting in better environment scalability and a smaller footprint on involved systems.

Figure 6:
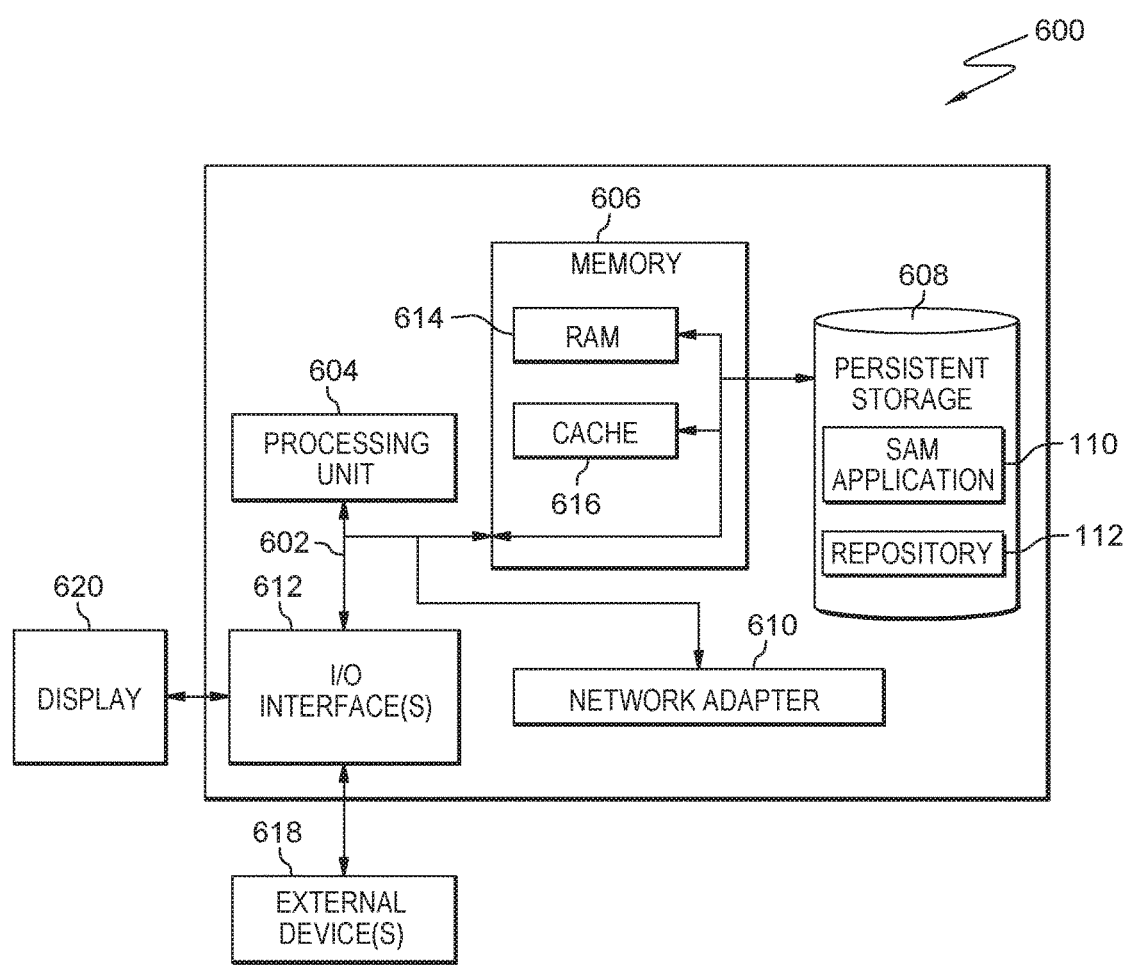
FIG. 6 depicts a block diagram of components of the host computer executing the software asset management program, in an embodiment in accordance with the present invention.

FIG. 6 depicts a block diagram, generally designated 600, of components of the host computer executing the software asset management program, in an embodiment in accordance with the present invention. It should be appreciated that FIG. 6 provides only an illustration of one implementation and does not imply any limitations with regard to the environments in which different embodiments may be implemented. Many modifications to the depicted environment may be made.

Host 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

SAM application 110 and repository 112 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 114 and 146 and agent and processing unit 116, 126 and 136, agent 148, 158, and 168. In these examples, communications unit 610 includes one or more network interface cards. Communications unit 610 may provide communications through the use of either or both physical and wireless communications links. SAM application 110 and repository 112 may be downloaded to persistent storage 608 through communications unit 610.

I/O interface(s) 612 allows for input and output of data with other devices that may be connected to server computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., SAM application 110 and repository 112, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:

1. A computer-implemented method comprising:
   in response to receiving a user query from a user computer via a network, determining, by one or more computer processors, monitoring data to be updated, wherein the monitoring data is stored on monitoring computers, wherein the monitoring data includes software license metrics;
   identifying, by one or more computer processors, collection methods to collect the monitoring data relating to specific versions of software from agents running at the monitoring computers;
   triggering, by one or more computer processors, the agents running at the monitoring computers to collect the monitoring data using the identified collection methods;
   storing, by one or more computer processors, the collected monitoring data in a table of a database in memory, wherein the table includes a plurality of columns;
   determining, by one or more computer processors, for each respective collection method of the collection methods, a respective cost of executing the respective collection method;
   assigning, by one or more computer processors, a weight to said each respective collection method of the collection methods based on the respective cost of executing the respective collection method;
   annotating, by one or more computer processors, the columns of the table with respective collection methods and costs corresponding to the collection of monitoring data in respective columns;
   translating, by one or more computer processors, the received user query into a Structured Query Lanquaqe (SQL) query;
   querying, by one or more computer processors, the table based, at least in part, on the SQL query, wherein during the querying one or more collection methods are selected in a way that minimizes a cost of operation on the agents running at the monitoring computers based on the respective costs and weights of the respective collection methods; and
   responding, by one or more computer processors, to the user query with results from the agents that include collected monitoring data from the table, based, at least in part, on the querying of the table.

2. The computer-implemented method of claim 1, wherein the monitoring computers are computers in a software asset management system.

3. A computer program product comprising:
   one or more computer readable storage media and program instructions stored on the one or more computer readable storage media, the stored program instructions comprising:
   program instructions to, in response to receiving a user query from a user computer via a network, determine monitoring data to be updated, wherein the monitoring data is stored on monitoring computers, wherein the monitorinq data includes software license metrics;
   program instructions to identify collection methods to collect the monitoring data relating to specific versions of software from aqents runninq at the monitoring computers;
   program instructions to trigger the agents running at the monitoring computers to collect the monitoring data using the identified collection methods;
   program instructions to store the collected monitoring data in a table of a database in memory, wherein the table includes a plurality of columns;
   program instructions to determine, for each respective collection method of the collection methods, a respective cost of executing the respective collection method;
   proqram instructions to assiqn a weiqht to said each respective collection method of the collection methods based on the respective cost of executing the respective collection method;
   program instructions to annotate the columns of the table with respective collection methods and costs corresponding to the collection of monitoring data in the respective columns;
   program instructions to translate the received user query into a Structured Query Language (SQL) query;
   program instructions to query the table based, at least in part, on the SQL query, wherein during the querying one or more collection methods are selected in a way that minimizes a cost of operation on the aqents runninq at the monitorinq computers based on the respective costs and weights of the respective collection methods; and
   program instructions to respond to the user query with results from the agents that include collected monitoring data from the table, based, at least in part, on the querying of the table.

4. The computer program product of claim 3, wherein the monitoring computers are computers in a software asset management system.

5. A computer system comprising:
one or more computer processors;
one or more computer readable storage media;
program instructions stored on the computer readable storage media for execution by at least one of the one or more processors, the stored program instructions comprising:
program instructions to, in response to receiving a user query from a user computer via a network, determine monitoring data to be updated, wherein the monitoring data is stored on monitoring computers, wherein the monitoring data includes software license metrics;
program instructions to identify collection methods to collect the monitoring data relating to specific versions of software from agents running at the monitoring computers;
program instructions to trigger the agents running at the monitoring computers to collect the monitoring data using the identified collection methods;
program instructions to store the collected monitoring data in a table of a database in memory, wherein the table includes a plurality of columns;
program instructions to determine, for each respective collection method of the collection methods, a respective cost of executing the respective collection method;
program instructions to assign a weight to each respective collection method of the collection methods based on the respective cost of executing the respective collection method;
program instructions to annotate the columns of the table with respective collection methods and costs corresponding to the collection of monitoring data in the respective columns;
program instructions to translate the received user query into a Structured Query Language (SQL) query;
program instructions to query the table based, at least in part, on the SQL query, wherein during the querying one or more collection methods are selected in a way that minimizes a cost of operation on the agents running at the monitoring computers based on the respective costs and weights of the respective collection methods; and
program instructions to respond to the user query with results from the agents that include collected monitoring data from the table, based, at least in part, on the querying of the table.

6. The computer system of claim 5, wherein the monitoring computers are computers in a software asset management system.

* * * * *